United States Patent [19]

Uchibori

[11] Patent Number: 4,911,171
[45] Date of Patent: Mar. 27, 1990

[54] ULTRASONIC BLOOD FLOW IMAGING APPARATUS

[75] Inventor: Takanobu Uchibori, Ootawara, Japan

[73] Assignee: Kabushiki Kaisha Toshiba, Tokyo, Japan

[21] Appl. No.: 208,499

[22] Filed: Jun. 20, 1988

[30] Foreign Application Priority Data

Jun. 20, 1987 [JP] Japan ................................ 62-154227

[51] Int. Cl.⁴ ............................................... A61B 8/00
[52] U.S. Cl. ................................................ 128/661.09
[58] Field of Search ........................ 128/661.08–661.1, 128/660.04; 73/861.25; 358/81–82

[56] References Cited

U.S. PATENT DOCUMENTS

| | | | |
|---|---|---|---|
| 4,761,740 | 8/1988 | Lipschutz | 128/660.05 X |
| 4,768,515 | 9/1988 | Namekawa | 128/661.09 |
| 4,785,402 | 11/1988 | Matsuo et al. | 128/661.08 |

FOREIGN PATENT DOCUMENTS

| | | |
|---|---|---|
| 3543604 | 6/1986 | Fed. Rep. of Germany ...................... 128/661.09 |
| 3820792 | 4/1989 | Fed. Rep. of Germany . |
| 59-20820 | 4/1984 | Japan ............................ 128/661.09 |
| 62-330 | 7/1987 | Japan ............................ 128/661.09 |

Primary Examiner—Francis Jaworski
Attorney, Agent, or Firm—Cushman, Darby & Cushman

[57] ABSTRACT

An ultrasonic blood flow imaging apparatus includes transmitter/receiver for transmitting drive pulses to an ultrasonic transducer, and receiving and converting an echo signal from the transducer into an image signal, a Doppler processing section for extracting a Doppler signal component from the echo signal, and blood flow information output section for obtaining the blood flow velocity from the Doppler signal component to provide blood flow velocity information. A color conversion section is provided which converts the blood flow information into a color signal containing a hue signal component representing a hue corresponding to the blood flow velocity. The color signal is displayed in the hue corresponding to the blood flow velocity.

14 Claims, 3 Drawing Sheets

ULTRASONIC BLOOD FLOW IMAGING APPARATUS

BACKGROUND OF THE INVENTION

1. Field of the Invention

The present invention relates to an ultrasonic blood flow imaging apparatus for acquiring blood flow information within a subject under examination utilizing the ultrasonic Doppler effect, and displaying the blood flow information as a two-dimensional image.

2. Description of the Related Art

Ultrasonic blood flow imaging apparatuses combine an ultrasonic Doppler method and a pulse-echo method to produce blood flow information and tomograph image (B mode) information by means of one ultrasonic probe, and simultaneously apply these pieces of information to a television monitor to visually display the superposed images of the blood flow profile and the tomograph image in colors on the monitor.

The above blood flow imaging is based on the following principle.

When being transmitted into a living subject within which blood flows, an ultrasonic beam is scattered by moving blood cells and subjected to the Doppler effect with the result that its center frequency fc is changed by fd. The frequency f of the ultrasonic echo undergone the Doppler effect becomes f=fc+fd. The frequencies fc and fd are are related as follows:

$$fd = 2v \times \cos\theta / c \times fc \quad (1)$$

where v is the blood flow velocity, θ is an angle made by the ultrasonic beam and the blood vessel, and c is the sound velocity.

Accordingly, the blood flow velocity v can be found by detecting the Doppler shift frequency fd.

To measure the blood flow velocity by utilizing the Doppler effect as described above, ultrasonic pulses are repeatedly transmitted several times from an ultrasonic transducer into the living subject in a given direction. The ultrasonic pulse echo waves from the subject, which have been subjected to the Doppler effect, are received by the ultrasonic transducer, and then sequentially converted into echo signals. The echo signals are applied to a phase detector to detect Doppler shift signals. In this case, the Doppler shift signals are detected for, for example, 256 sample points along a steering direction of the ultrasonic pulses. The Doppler shift signals detected at the respective sample points are frequency-analyzed by a frequency analyzer, and then converted into a video signal by a digital scan converter (DSG) in order to display a blood flow profile image on the TV monitor.

The above operation is performed for each of a plurality of steering lines, so that a flow velocity profile corresponding to the steering lines is two-dimensionally displayed.

The flow velocity profile is conventionally displayed in gray. It is difficult, therefore, to discriminate between the flow velocity profile and the tomograph which are superposed and displayed on the TV monitor. Consequently, the velocity of the blood flow in a direction is subdivided into several velocity ranges, and a predetermined color is allocated to each velocity subdivision. The allocated colors are displayed according to the blood flow velocity, and the blood flow velocity is judged on the basis of the displayed color. With such a method, however, it is difficult to recognize a relationship between a specific color and a direction of the blood flow. To obviate this difficulty, a method has been devised which displays the direction of blood flow in red (for one direction) or in blue (for the opposite direction), and expresses the blood flow velocity through changes in the brightness (intensity) of red or blue. In the case of this method, however, it is very difficult to differentiate wide changes in blood flow velocity. This is because, even if the brightness of the red color is changed with a change in the blood flow velocity, this change of the brightness can hardly be perceived. Hence, it is difficult to determine the change of the flow velocity. Further, because of the correspondence of the flow velocity to the brightness of a color, a low flow velocity is indicated by a dark red or blue owing to a reduction in the brightness. Thus, the low flow velocity becomes difficult to find out.

SUMMARY OF THE INVENTION

It is an object of this invention to provide an ultrasonic blood flow imaging apparatus capable of distinguish differences of blood flow velocity definitely and readily.

According to the present invention, an ultrasonic blood flow imaging apparatus includes means for converting blood flow velocity into hue information in order to display differences of the blood flow velocity through hues.

DETAILED DESCRIPTION OF THE PREFERRED EMBODIMENTS

Figure 1:
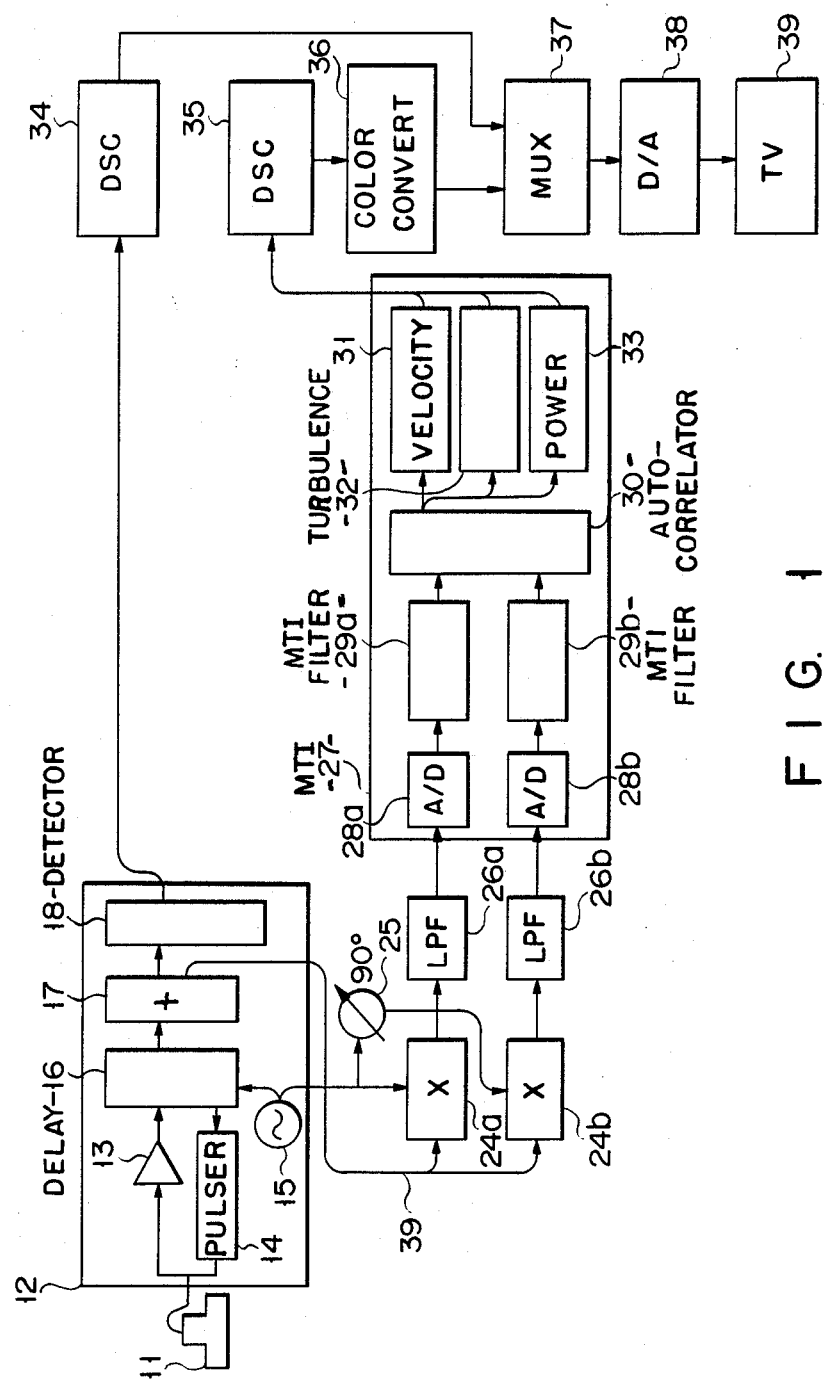
FIG. 1 is a block diagram of an blood flow imaging apparatus according to an embodiment of the present invention.

Referring now to FIG. 1, an ultrasonic transducer 11 is constructed of an array of ultrasonic transducer elements for transmitting an ultrasonic beam and receiving an ultrasonic echo. Ultrasonic transducer 11 is coupled to a transmitting/receiving circuit 12. Transmitting-/receiving circuit 12 includes a pulser 14 for providing drive pulses to transducer 11 and a preamplifier 13 for amplifying an echo signal from transducer 11. The output of preamplifier 13 and the input of pulser 14 are coupled to a delay circuit 16. For sector scan, delay circuit 16 provides to the pulser delay signals for directing an ultrasonic beam in each scan direction and focusing it, and delay-processes a received echo signal in accordance with the delay times used in transmission of the ultrasonic beam. The output of delay circuit 16 is coupled to an adder 17. Adder 17 adds together delay-processed echo signals and provides a sum signal to a detector 18. Detector 18 detects and converts the sum signal into a tomographic image signal.

The output of transmitting/receiving circuit 12, i.e., the output of detector 18 is coupled to a digital scan converter (DSC) 34. An output of adder 17 is coupled to an input of each of mixers 24a and 24b via a signal line 39. Mixers 24a and 24b have their other inputs coupled to an oscillator 15 and a 90-degree phase shifter 25, respectively. Oscillator 15 applies a reference signal fo to delay circuit 16 and mixer 24a. Phase shifter 25 shifts the reference signal fo output from oscillator 15 by 90 degrees to provide to mixer 24b a signal 90-degrees out of phase with the reference signal fo. Consequently, mixers 24a and 24b output Doppler shift signals fd and 2fo+fd, respectively.

The outputs of mixers 24a and 24b are coupled to lowpass filters 26a and 26b, which filter out high frequency components of the Doppler shift signals fd and fo+fd to extract the Doppler shift signal fd only. The outputs of lowpass filters 26a and 26b are coupled to an MTI (moving target indication) circuit 27 which receive the Doppler shift signal fd as an phase-detected output signal for calculating blood flow information.

MTI circuits 27 includes A/D converters 28a and 28b coupled to lowpass filters 26a and 26b. A/D converters 28a and 28b are coupled via MTI filters 29a and 29b, respectively, to an autocorrelation circuit 30. MTI is a technique which has been implemented in the field of radar engineering for detecting a moving target utilizing the Doppler effect. In this embodiment of the present invention, the moving target is blood cells. Autocorrelator 30 is a kind of frequency analyzer and adapted for analyzing frequencies at multiple points associated with two-dimensional information in real time.

The output of autocorrelator 30 is coupled to a mean velocity calculation circuit 31, a turbulence calculation circuit 32, and a power calculation circuit 33. Mean velocity calculation circuit 31 calculates the blood flow velocity from the Doppler shift signal whose frequency has been analyzed by autocorrelator 30. Turbulence calculation circuit 32 finds out the color turbulence from the Doppler shift signal. Power calculation circuit 33 calculates the power from the Doppler shift signal.

The outputs of MTI circuit 27, namely, the outputs of mean velocity calculation circuit 31, turbulence calculation circuit 32 and power calculation circuit 33 are coupled via a digital scan converter (DSC) 35 to a color converter 36. Color converter 36 converts signals indicative of the direction and velocity of blood flow into RGB color signals as described later. The output of color converter 36 is coupled to a multiplexer 37 along with the output of digital scan converter 34. The output of multiplexer 37 is coupled via a D/A converter 38 to a color television monitor 39.

Figure 2:
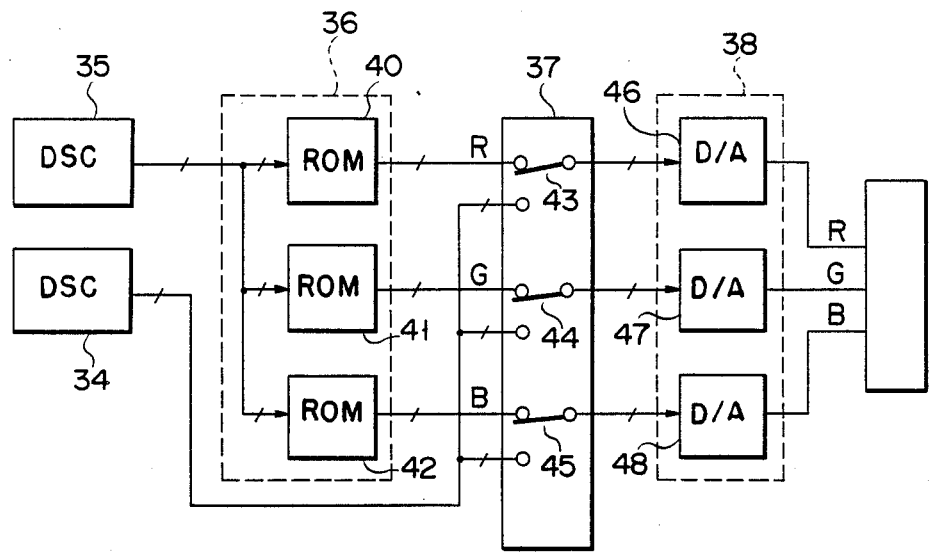
FIG. 2 is a circuit diagram of the color processing circuitry in FIG. 1.

Referring to FIG. 2, a color processing system, which is integral to the present invention, comprises color converter 36, multiplexer 37 and D/A converter 38. As shown, color converter 36 is comprised of ROMs (read only memories) 40, 41 and 42 to receive an output signal of scan converter 35. The information to be stored in these ROMs is determined as follows.

Figure 3A:
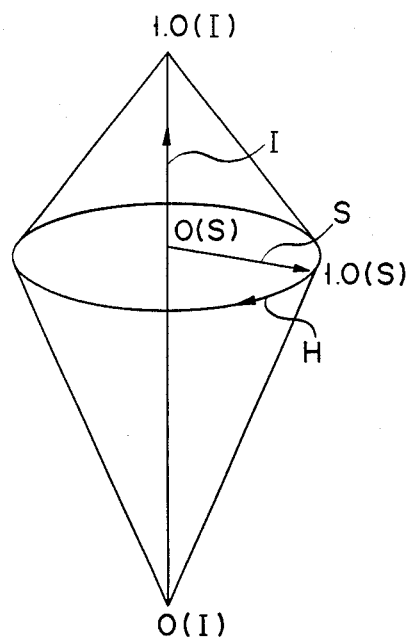
FIGS. 3A and 3B are diagrams for explaining the Munsell color system.
Figure 3B:
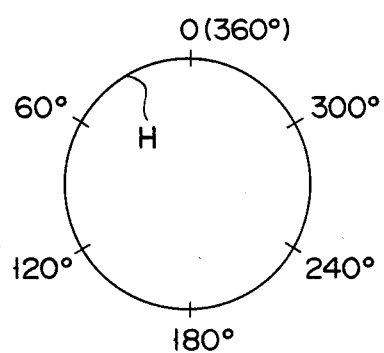

In the Munsell HSI color system shown in FIGS. 3A and 3B, I (intensity) is set to $0 \leq I \leq 1$, S (saturation) to $0 \leq S \leq 1$, and H (hue) to $0 \leq H \leq 360°$.

According to the present invention, because the blood flow velocity is indicated by a change in hue, I is fixed, for example, at 0.5, and S is fixed, for example, at 1.0. On the other hand, H is given by expressions (2) and (3) and varies with the flow velocity and the flow direction.

$$H = A + B \times v/\tfrac{1}{2} \qquad (2)$$

where v is the flow velocity, and $0 \leq v \leq \tfrac{1}{2}$.

$$H = C + D \times -v/\tfrac{1}{2} \qquad (3)$$

where $-\tfrac{1}{2} < v \leq 0$.

A, B, C, D are each a constant ranging from 0 to 360. By way of example, when A=120, B=50, C=360, D=−50, a color indicative of the velocity of blood flowing toward an observer changes from red to yellow, while a color for the velocity of blood flowing away from the observer changes from blue to light blue. The H, S, I corresponding to the blood flow velocity are converted into R, G, B using the following HSI inverse conversion table.

HSI-RGB CONVERSION TABLE

| H | calculating R | calculating G | calculating B |
|---|---|---|---|
| $0 \leq H = 60$ | $m + (M - m)(H/60)$ | m | M |
| $60 \leq H = 120$ | M | | |
| $120 \leq H = 180$ | | | $m + (M - m)\left(\dfrac{120 - H}{60}\right)$ |
| | | $m + (M - m)\left(\dfrac{H - 120}{60}\right)$ | m |
| $180 \leq H = 240$ | | | |
| | $m + (M + m)\left(\dfrac{240 - H}{60}\right)$ | | |
| $240 \leq H = 300$ | | | |
| | | | $m + (M - m)\left(\dfrac{H - 240}{60}\right)$ |
| $300 \leq H = 360$ | | | M |
| | | $m + (M + m)\left(\dfrac{360 - H}{60}\right)$ | |
| when | $I \leq 0.5$ | $M = I \times (1 + S)$ | |
| when | $I > 0.6$ | $M = I + S \times (1 - I)$ | |
| | $m = 2 \times I - M$ | | |

According to the above table, when intensity $I \leq 0.5$, M is obtained from $M = I \times (1+S)$, while, when intensity $I > 0.5$, M is obtained from $= I \times (1+I)$. In addition, a factor m is obtained from $m - 2 \times I - M$.

When M and m are obtained from the above expressions, R, G, B are determined in accordance with the value of hue (H). That is to say, when $0 \leq H = 60$, R is calculated from $M + (M-m)(H/60)$. At this time G and B are equal to m and M, respectively. When $60 \leq H = 120$, R is set at M, and B is found from $m + (M-m)((H-120)/60)$. G is equal to m. In this way, R, G, B are determined from the table according to the values of H, S, I.

The conversion tables formed according to the above table are stored in ROMS 40, 41, 42. It is to be noted that, when the blood velocity v is 0 or below a predetermined level (a value for a slow variation in the blood flow velocity as in breathing), R, G, B are determined as follows.

$$R = G = B = 0 \quad (4)$$

The outputs of ROMs 41, 42, 43 are coupled to switches 43, 44, 45 of multiplexer 37 together with the output of digital scan converter 34. Multiplexer 37 selectively couples either the outputs of ROMs 40, 41, 42 or the output of digital scan converter 34 to D/A converters 46, 47, 48 by changing-over of switches 43, 44, 45. The outputs of D/A converters 46, 47, 48 are coupled to television monitor 39.

In operation, when the apparatus is started, the reference signal fo is applied from oscillator 15 to delay circuit 16, mixer 39 and phase shifter 25. Delay circuit 16 responds to the reference signal to provide to pulser 14 delay signals suitable for a sector scan, for example. Pulser 14 responds to the delay signals to apply drive pulses for sector scan to ultrasonic transducer 11. Ultrasonic transducer 11 transmits ultrasonic beams into a subject under examination, and receives and converts echoes of the ultrasonic beams from the subject into echo signals corresponding to the ultrasonic transducer elements (not shown) constituting ultrasonic transducer 11.

Each echo signal is amplified in preamplifier 13, and then applied to delay circuit 16. Delay circuit 16 delays the echo signal by the delay times used in transmission of the ultrasonic beam, and sends the delayed outputs to adder 17. Adder 17 adds the delayed echo signals and provide the resultant sum signal to detector 18. Detector 18 detects and converts the sum signal into an image signal. The image signal is in turn converted into a digital video signal by digital scan converter 34. The digital video signal is applied via multiplexer 37 to D/A converter 38 to be converted to an analog video signal, which is applied to TV monitor 39 to visually display a tomograph image (B mode image).

Next, the operation for obtaining the Doppler information when the B-mode image information is obtained as described above will be described.

To obtain the Doppler information, ultrasonic transducer 11 receives drive pulses from pulser 14 and transmits a predetermined number (e.g. eight pulses) of ultrasonic pulses, along a given direction, into a region of interest whose blood flow velocity is to be detected. As a result, an echo signal is provided from tranducer 11, and then subjected to the same signal processing as described above by preamplifier 13, delay circuit 16 and adder 17 for application to mixers 24a and 24b.

Mixer 24a mixes the input echo signal with the reference signal fo from oscillator 15 to apply the Doppler shift signal fd to lowpass filter 26a, while mixer 24b mixes the input echo signal with the 90-degree phase-shifted reference signal from phase shifter 25 to provide the Doppler shift signal 2fo+fd to lowpass filter 26b. Lowpass filters 26a and 26b remove high-frequency components from the Doppler shift signals and provide only the Doppler shift signal fd to MTI circuit 27.

In MTI circuit 27, A/D converters 28a and 28b convert the Doppler shift signal fd into digital signals and apply these digital signals to MTI filters 29a and 29b, which remove clutter components from the digital Doppler signals. The filtered Doppler shift signals are applied to autocorreltor 30 where the frequency analysis of the Doppler shift signals is performed. An output signal of autocorrelator 30 is applied to mean velocity calculation circuit 31, dispersion calculation circuit 32 and power calculation circuit 33 to calculate the mean velocity, the dispersion and the power of the ultrasonic echo.

Signals representing the mean velocity, the turbulence and the power are applied to digital scan converter 35 to be converted into a video signal. When the video signal is applied to color converter 36, R, G, B signals are read out of ROMs 40, 41 and 42, in accordance with the mean velocity, the turbulence and the power.

As described before, for example, I is fixed at 0.5, S is fixed at 1.0, and H is calculated by expressions (2) and (3). These values H, S, and I are stored into ROMs 40, 41 and 42, in a table form, in correspondence with the mean velocity, the turbulence, and the power output from mean velocity calculation circuit 31, dispersion calculation circuit 32 and power calculation circuit 33. Accordingly, when the mean velocity, the turbulence, and the power are supplied to color converter 36, R, G, B corresponding to the mean velocity, the turbulence, and the power are read out of ROMs 40, 41 and 42.

The R, G, B signals read from ROMs 40, 41, 42 are applied via switches 43, 44, 45 of multiplexer 37 to D/A converters 38, 39, 40 to be converted into analog signals. When the R, G, B signals are applied in analog form to color TV monitor 39, the blood flow velocity is displayed on the monitor by a hue corresponding to the blood flow direction and velocity with the intensity held at a predetermined level.

Because switches 43, 44, 45 of multiplexer 37 are changed over, the blood flow velocity profile and the video signal (tomograph image) are alternately applied to TV monitor 39 with the result that the superposed images of the flow velocity profile and the tomograph image are displayed. Therefore, positions where changes in the blood flow velocity may have occurred may readily be recognized on a background image formed by the tomograph image. This may improve the accuracy of diagnosis.

As described above, because changes in the blood flow direction and velocity are displayed as changes in hue, even the low flow velocity can be displayed at the same intensity (bightness) as the high fow velocity. Therefore, the blood flow of low velocity can be sufficiently recognized.

What is claimed is:

1. An ultrasonic blood flow imaging apparatus comprising:
    ultrasonic transducer means for transmitting an ultrasonic beam into a subject under examination, and receiving and converting an echo of the ultrasonic beam reflected from within the subject into an echo signal;
    transmitting/receiving means, coupled to said ultrasonic transducer means, for generating driving signals to cause said ultrasonic transducer means to transmit the ultrasonic beam, and converting the echo signal from said ultrasonic transducer means into an image signal;
    Doppler processing means, coupled to said transmitting/receiving means, for extracting a Doppler signal component from the echo signal;
    blood flow information output means, coupled to said Doppler processing means, for calculating a blood flow velocity from the Doppler signal component and outputting a blood flow velocity information;

color conversion means, coupled to said blood flow information output means, for converting the blood flow velocity information into a color signal having a hue signal component related to the blood flow velocity and having a predetermined constant intensity; and output means, coupled to said color conversion means, for visually outputting the constant intensity color signal as a color image.

2. An ultrasonic blood flow imaging apparatus according to claim 1, wherein said color conversion means includes memory means for storing a conversion table by which the blood flow information flow output from said blood flow output means is converted into the hue information.

3. An ultrasonic blood flow imaging apparatus according to claim 1, wherein said blood flow information output means includes calculation means for calculating (1) mean velocity, (2) turbulence of the blood flow, and (3) power of the echo, from the Doppler signal component; and said color conversion means includes means for converting the mean velocity, the turbulence, and the power into R, G, B color signals corresponding thereto.

4. An ultrasonic blood flow imaging apparatus according to claim 3, wherein said color conversion means includes memory means for storing a correspondence between R, G, B color signals, a mean velocity, a turbulence, and a power, and said color conversion means includes means for reading out, in accordance with the mean velocity, the turbulence, and the power output from said calculation means, a corresponding R, G, B color signal.

5. An ultrasonic blood flow imaging apparatus according to claim 4, wherein said memory means includes three read only memories, each corresponding to the R, G, and B color signals, respectively.

6. An ultrasonic blood flow imaging apparatus according to claim 1, further comprising means for selectively supplying the image signal output from said transmitting/receiving means and the color signal output from said color conversion means to said output means.

7. An ultrasonic blood flow imaging apparatus comprising ultrasonic transducer means for transmitting an ultrasonic beam into a subject, and receiving an echo of the ultrasonic beam as an echo signal;

transmitting/receiving means, coupled to said ultrasonic transducer means, for driving said ultrasonic transducer means so as to sector-scan the subject, and for processing the echo signal output from said ultrasonic transducer means to convert it into an image signal corresponding to said sector-scanning;

Doppler processing means, coupled to said transmitting/receiving means, for extracting a Doppler signal component from the echo signal;

blood flow information output means coupled to said Doppler processing means, for calculating a blood flow velocity from the Doppler signal component and outputting blood flow velocity information;

color conversion means coupled to said blood flow information output means, for converting the blood flow velocity information into a color signal including a hue signal component related to the blood flow velocity and including an intensity signal component having a predetermined constant intensity; and display means for displaying the image signal and the color signal at said constant intensity, as a B-mode image and a profile image including the hue changing in accordance with the blood flow velocity.

8. An ultrasonic blood flow imaging apparatus for imaging a velocity of blood flow, comprising:

ultrasonic transducer means for transmitting an ultrasonic beam into a subject under examination, and receiving and converting an echo of the ultrasonic beam reflected from within the subject into an echo signal;

transmitting/receiving means, coupled to said ultrasonic transducer means, for generating driving signals to cause said ultrasonic transducer means to transmit the ultrasonic beam, and converting the echo signal from said ultrasonic transducer means into an image signal;

Doppler processing means, coupled to said transmitting/receiving means, for extracting a Doppler signal component from the echo signal, said Doppler signal component of the type which changes in accordance with variation in the velocity of blood flow;

blood flow information output means, coupled to said Doppler processing means, for calculating the velocity of blood flow from the Doppler signal component and outputting blood flow velocity information corresponding to the calculated velocity of blood flow;

color conversion means, coupled to said blood flow information output means, for converting the blood flow velocity information into a color signal containing a hue signal component indicative of a hue changing in correspondence with the calculated velocity of blood flow, and an intensity component having a predetermined constant intensity; and output means, coupled to said color conversion means, for outputting the color signal as a color image having the hue changing in correspondence with the velocity of blood flow and the constant intensity.

9. An ultrasonic blood flow imaging apparatus according to claim 8, wherein said color conversion means includes memory means for storing a conversion table between blood flow information from said blood flow nformation output means and hue information and means for inputting said blood flow information into said memory means to look up a corresponding hue information.

10. An ultrasonic blood flow imaging apparatus according to claim 8, wherein said blood flow information output means includes calculation means for calculating mean velocity, turbulence of the blood flow, and power of the echo from the Doppler signal component, and said color conversion means includes means for converting the mean velocity, the turbulence, and the power into R, G, and B signals corresponding thereto.

11. An ultrasonic blood flow imaging apparatus according to claim 10, wherein said color conversion means includes memory means for storing R, G, and B color signals corresponding to the mean velocity, the turbulence, and the power, and which are read out in accordance with the mean velocity, the turbulence, and the power output calculated by said calculation means.

12. An ultrasonic blood flow imaging apparatus according to claim 11, wherein said memory means includes read only memories corresponding to the R, G, and B color signals, respectively.

13. An ualtrasonic blood flow imaging apparatus according to claim 8, which includes means for selectively supplying the image signal output from said transmitting/receiving means and the color signals output from said color conversion means to said output means.

14. A method for imaging a velocity of blood flow, comprising the steps of:

transmitting an ultrasonic beam into a subject under examination;

receiving an echo of the ultrasonic beam and converting the echo into an echo signal;

extracting a Doppler signal component from the echo signal, which Doppler signal component changes in accordance with a variation in velocity of blood flow;

calculating a velocity of blood flow from the Doppler signal component;

converting the blood flow velocity into a color signal that has a hue signal component that changes in correspondence with the calculated velocity of blood flow, and an intensity component which is a predetermined constant intensity; and visually outputting the color signal as a color image with a changing hue and a constant intensity.

* * * * *